(12) United States Patent
Parthasarathy et al.

(10) Patent No.: US 9,203,780 B2
(45) Date of Patent: Dec. 1, 2015

(54) TECHNIQUES TO DISTRIBUTE MESSAGES USING COMMUNICATION PIPELINES

(75) Inventors: Vijay Kishen Hampapur Parthasarathy, Sammamish, WA (US); Moustafa Noureddine, Redmond, WA (US); Ranjith Narayanan, Redmond, WA (US)

(73) Assignee: MICROSOFT TECHNOLOGY LICENSING, LLC, Redmod, WA (US)

( * ) Notice: Subject to any disclaimer, the term of this patent is extended or adjusted under 35 U.S.C. 154(b) by 213 days.

(21) Appl. No.: 13/360,511

(22) Filed: Jan. 27, 2012

(65) Prior Publication Data

US 2013/0198293 A1 Aug. 1, 2013

(51) Int. Cl.
*H04L 12/933* (2013.01)
*H04L 12/58* (2006.01)
*H04L 12/935* (2013.01)

(52) U.S. Cl.
CPC .......... *H04L 49/1546* (2013.01); *H04L 51/043* (2013.01); *H04L 49/3063* (2013.01)

(58) Field of Classification Search
CPC ......... H04L 45/00; H04L 12/56; H04L 45/72; H04L 41/043; H04L 49/1546; H04L 49/3063; H04L 2209/125
USPC ......... 709/206, 230, 232, 235, 236, 238, 240, 709/244
See application file for complete search history.

(56) References Cited

U.S. PATENT DOCUMENTS

| | | | |
|---|---|---|---|
| 6,192,417 B1 * | 2/2001 | Block et al. .................... 709/249 |
| 6,549,538 B1 * | 4/2003 | Beck et al. ................ 370/395.52 |
| 6,731,638 B1 * | 5/2004 | Ofek .......................... 370/395.4 |
| 6,954,784 B2 * | 10/2005 | Aiken et al. ................... 709/220 |
| 7,140,017 B2 * | 11/2006 | Chen et al. .................... 718/101 |
| 7,227,927 B1 | 6/2007 | Benedyk et al. |
| 7,577,956 B2 * | 8/2009 | Chen et al. .................... 718/101 |
| 7,640,300 B2 | 12/2009 | Wohlgemuth et al. |
| 7,647,595 B2 | 1/2010 | Chandrasekaran |
| 7,664,724 B2 * | 2/2010 | Lucovsky et al. ............. 707/781 |
| 7,711,810 B2 | 5/2010 | McKinnon et al. |
| 7,721,152 B1 * | 5/2010 | Joshi et al. ...................... 714/25 |
| 7,760,719 B2 * | 7/2010 | Yik et al. ....................... 370/389 |
| 8,295,450 B2 * | 10/2012 | Helferich ................... 379/88.22 |
| 8,683,221 B2 * | 3/2014 | Peet et al. ...................... 713/189 |
| 2002/0124089 A1 * | 9/2002 | Aiken et al. .................... 709/227 |
| 2003/0131073 A1 * | 7/2003 | Lucovsky et al. ............. 709/219 |
| 2004/0059781 A1 | 3/2004 | Yoakum et al. |

(Continued)

OTHER PUBLICATIONS

"Notify.me Architecture—Synchronicity Kills", Retrieved at <<http://highscalability.com/notify-me-architecture-synchronicity-kills>>, 2008, pp. 15.

(Continued)

*Primary Examiner* — Jimmy H Tran

(74) *Attorney, Agent, or Firm* — Andrew Smith; Aaron Hoff; Micky Minhas

(57) ABSTRACT

Techniques to distribute messages using communication pipelines are described. An apparatus may comprise a message receiving component operative to receive a message at a first server for forwarding to a virtual receiver, a routing component operative to identify a second server maintaining the virtual receiver and determine a communication pipeline between the first server and the second server, and a message sending component operative to send the message from the first server to the second server over the communication pipeline. Other embodiments are described and claimed.

19 Claims, 9 Drawing Sheets

(56) References Cited

U.S. PATENT DOCUMENTS

| | | |
|---|---|---|
| 2004/0062383 A1 | 4/2004 | Sylvain |
| 2004/0078450 A1* | 4/2004 | Chen et al. .................... 709/214 |
| 2005/0086469 A1 | 4/2005 | Dunagan et al. |
| 2006/0002386 A1* | 1/2006 | Yik et al. ...................... 370/389 |
| 2007/0016691 A1 | 1/2007 | Pepin et al. |
| 2008/0021955 A1 | 1/2008 | Stallings |
| 2008/0219425 A1 | 9/2008 | Wang |
| 2008/0270610 A1 | 10/2008 | John et al. |
| 2010/0322236 A1* | 12/2010 | Vimpari et al. ............... 370/389 |
| 2011/0066676 A1* | 3/2011 | Kleyzit et al. ................ 709/203 |
| 2012/0039308 A1* | 2/2012 | Kim et al. ..................... 370/336 |
| 2012/0324000 A1* | 12/2012 | Kang et al. .................... 709/204 |
| 2013/0058342 A1* | 3/2013 | Casado et al. ................ 370/392 |

OTHER PUBLICATIONS

"International Search Report", Mailed Date: May 15, 2013, Application No. PCT/US2013/022437, Filed Date: Jan. 22, 2013, pp. 10.

* cited by examiner

TECHNIQUES TO DISTRIBUTE MESSAGES USING COMMUNICATION PIPELINES

BACKGROUND

In computer and telecommunications networks, presence information is used to convey ability and willingness of a potential communication partner to communicate. The communication partner typically provides presence state information via a network connection to a presence service. The presence service publishes the presence state information to a set of watchers, who can then determine whether the communication partner is available or willing to open a communication channel. The more accurate or precise the presence state information, the more effective communications becomes between two or more parties.

Currently, computer and telecommunications networks are experiencing a huge increase in user and machine-to-machine (M2M) traffic, partially due to an increase in subscribers to presence state information. Presence state information, once limited to a few communications applications such as instant messaging (IM) or electronic mail (email), has expanded to include a multiplicity of communications applications and systems, such as short messaging service (SMS), multimedia messaging service (MMS), group chat systems, multimedia conferencing systems, document collaboration systems, telephony systems, social networking systems, and so forth. Further, an increasing number of applications and systems are being implemented using cloud computing technologies, thereby increasing access and convenience to applications and systems providing presence state information. The increase in subscribers to presence state information is creating increased volumes network traffic, which in turn is increasing complexity and costs in managing presence systems. It is with respect to these and other considerations that the present improvements are needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to distribute messages using communication pipelines. Some embodiments are particularly directed to techniques to distribute presence information using communication pipelines where presence information is communicated to a server hosting a plurality of receivers using a single message. In one embodiment, for example, an apparatus may comprise a message receiving component operative to receive a message at a first server for forwarding to a virtual receiver, a routing component operative to identify a second server maintaining the virtual receiver and determine a communication pipeline between the first server and the second server, and a message sending component operative to send the message from the first server to the second server over the communication pipeline. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
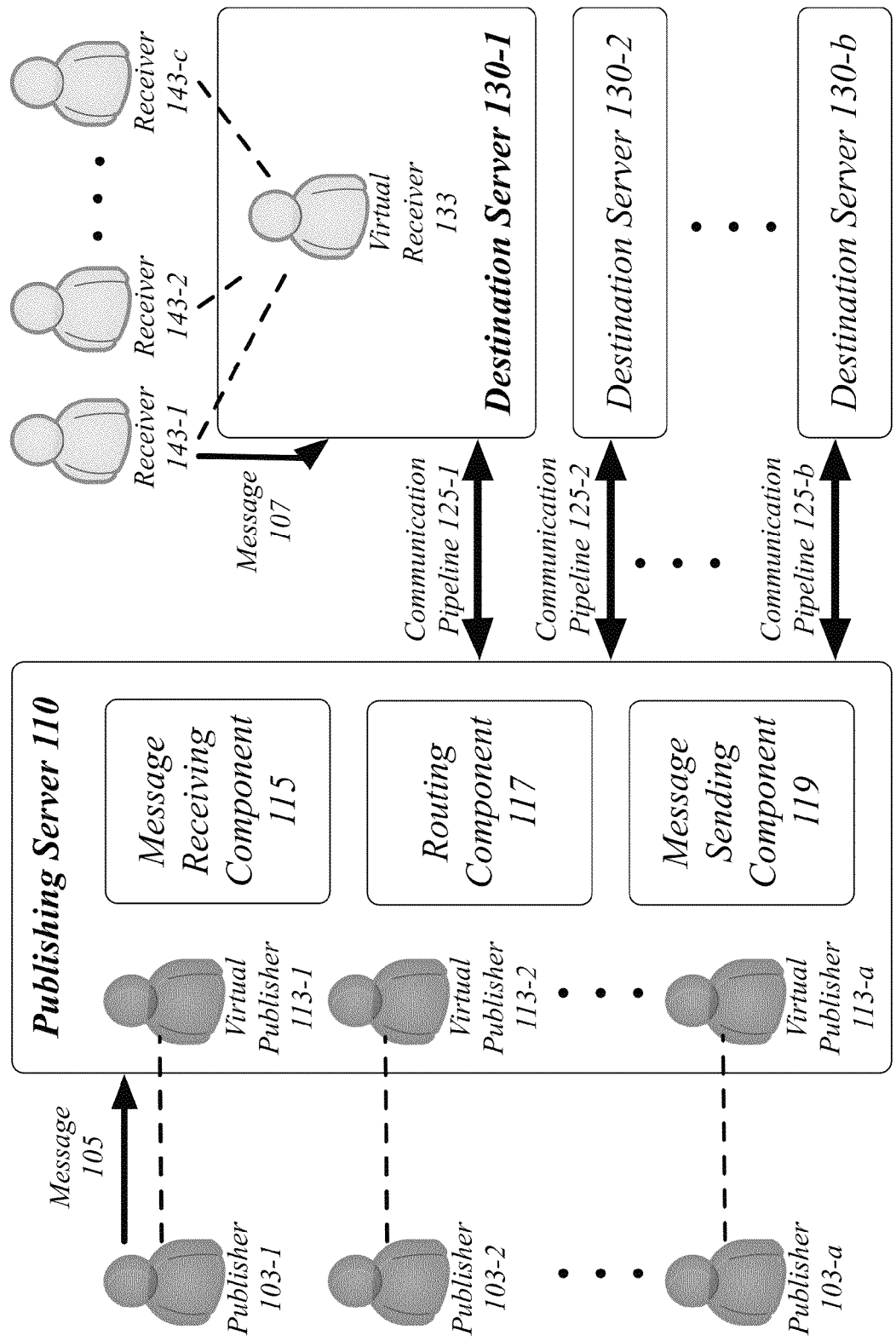
FIG. 1 illustrates an embodiment of a messaging system to distribute messages using communication pipelines.

Various embodiments are directed to techniques to distribute messages using communication pipelines. Various embodiments are particularly directed to enhanced techniques to communicate presence information for a presentity based on routing rules for one or more presentity nodes in a communications network. The term "presentity" may refer to an entity described by presence information. The entity may comprise, for example, a human user or operator of an electronic device. A presentity node may refer to an electronic device used by a presentity to convey presence state information to watcher nodes over a network. The watcher nodes display the presence state information for other human users or operators sometimes referred to as watchers. The watchers may then determine whether a presentity is willing and/or able to communicate with another communication partner based on the presence state information.

A presentity node may publish presence state information to indicate its current communication status. This published presence state information informs others that desire to contact the presentity of his/her availability and willingness to communicate. A common use of presence state information is to display an indicator icon on a communication application, such as an instant messaging (IM) client. The indicator icon may comprise a graphic symbol corresponding with an easy-to-convey meaning, and a list of corresponding text descriptions for each of the states. Examples of such text descriptions may include "free for chat," "busy," "away," "do not disturb," "out to lunch" and so forth. Such presence states exist in many variations across different communications clients. Current standards typically support a rich choice of additional presence attributes that can be used for presence information, such as user mood, location, or free text status.

The publishing of presence state information can be seen, in a general sense, as the communication of a message from a publisher to one or more receivers. The publish of presence state information specifically presents a leading problem in message communication because of the large number of receivers—subscribers to the publisher—that the communication may be sent to. A communication network may comprise a plurality of servers, where each server hosts a plurality of receivers and publishers. In this context, a server can be said to host a receiver if it forms the communication endpoint the receiver uses to connect to the communication network, such as a receiver hosted on a client computer or mobile device connecting to a communication server within the communication network to send and receive messages. It will be appreciated that a client hosted by a server may be both a publisher and receiver, or may act as each of a publisher and receiver at different times; as such. while the terms "publisher," "receiver," "watcher," and "subscriber" may be assigned to a particular client, these terms may merely reflect the current function of the client for a given communication (publishing, receiving, etc.) and that for other communications a client that was once a publisher may act as a receiver and vice-versa.

For some messages—particularly notifications containing presence state information that might be broadcast to a very large number of subscribers—multiple receivers for the message may be hosted on a single server. In some conventional messaging systems, a message—such as a notification—may be individually transmitted from the publisher to the receiver for each receiver. For example, if a publisher of presence state information has twenty subscribers, the communication of presence state information from the publisher to the twenty subscribers may comprise twenty messages sent from the publisher—or from the server hosting the publisher—to the receivers. In cases in which multiple receivers are hosted on a single server, greater efficiency can therefore be realized by sending a single copy of the messages from the server hosting the publisher to the server hosting the multiple receivers. The server hosting the multiple receivers may then transmit the message to each of the multiple receivers, effectively demultiplexing a single message into a plurality of messages carrying the same message information. In the example discussed above, if twelve of the twenty describes are hosted on a first server, and the other eight on a second, then a single message may be sent to the first server and a single message sent to the second server. As such, rather than twenty messages being transmitted across the communication network, only two would be. As a result, the embodiments can improve affordability, scalability, and extendibility for message communication network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a messaging system 100. In one embodiment, the messaging system 100 may comprise a computer-implemented messaging system 100 having a publishing server 110 hosting a plurality of publishers 103-$a$ each represented by a virtual publisher 113-$a$, a plurality of destination servers 130-$b$ each hosting a plurality of receivers such as receivers 143-$c$, wherein publishing server 110 is connected to each of destination servers 130-$b$ using a plurality of communication pipelines 125-$b$. Although the messaging system 100 shown in FIG. 1 has a limited number of elements in a certain topology, it may be appreciated that the messaging system 100 may include more or less elements in alternate topologies as desired for a given implementation.

It is worthy to note that "a" and "b" and "c" and similar designators as used herein are intended to be variables representing any positive integer. Thus, for example, if an implementation sets a value for b=5, then a complete set of destination servers 130-$b$ may include servers 130-1, 130-2, 130-3, 130-4 and 130-5. The embodiments are not limited in this context.

It will be appreciated that while FIG. 1 publishing server 110 and destination servers 130-$b$ are labeled as being "publishing" and "destination" servers, that these labels are intended to illustrate the role of these servers when a message is received by publishing server 110 for forwarding to receivers hosted by the destination servers 130-$b$. In some embodiments, each of the publishing server 110 and destination servers 130-$b$ may host a plurality of publishers and receivers—or a plurality of clients each capable of both publishing and receiving—such that whichever server hosts the publisher of a message would comprise the publishing server 110 and whichever servers host the receivers would comprise the destination servers 130-$b$. As a whole, the publishing server 110 and destination servers 130-$b$ may comprise the servers which make up a communication network or a cluster within a communication network, wherein an individual server's role as publisher or destination for a given communication or transaction is determined according to which server is hosting the specific publisher and receivers.

A publishing server 110 may comprise a plurality of components: a message receiving component 115 operative to receive a message 105 at a publishing server 110 for forwarding to a virtual receiver 133, a routing component 117 operative to identify a destination server 130-1 maintaining the virtual receiver 133 and determine a communication pipeline 125-1 between the publishing server 110 and the destination server 130-1, and a message sending component 119 operative to send the message 105 from the publishing server 110 to the destination server 130-1 over the communication pipeline 125-1. The publishing server 110 may be operative to provide communication services—such as presence information publishing services—for a plurality of publishers 103-a. In order to provide the communication services, the publishing server 110 may be operative to maintain a plurality of virtual publishers 113-a, wherein each virtual publisher 113-a is associated with a corresponding publisher 103-a, such that each publisher is associated with a virtual publisher. A publisher 103-a may comprise a client account, client application, client device, or other mechanism by which a user initiates messages such as presence information updates. In general, a publisher 103-a may comprise a presentity node. It will be appreciated that while in the illustrated embodiment each publisher 103-a is associated with a single virtual publisher 113-a, that a plurality of publishers may be associated with a single virtual publisher such that the number of publishers may be larger than the number of virtual publishers. In some embodiments, a virtual publisher may represent a plurality of publisher which are each subscribed to by one or more receivers on a particular server.

In general, the message receiving component 115 operative to receive a message 105 at a publishing server 110 for forwarding to a virtual receiver 133. In various embodiments, the message 105 may be received from a publisher 103-1, wherein publisher 103-1 is associated with a virtual publisher 113-1. In various embodiments, the virtual publisher 113-1 may comprise a virtual publisher object. A virtual publisher object may be used to represent a plurality of publishers watched by a remote entity, such as one or more receivers hosted by a destination server. Similarly, the virtual receiver may represent a group of receivers 143-c associated with the destination server 130-1. As such, in some embodiments, the received message is associated with a virtual publisher maintained by the first server, wherein each receiver of the group of receivers 143-c is subscribed to the virtual publisher 113-1.

As previously discussed, in some embodiments the received message 105 may comprise a presence notification message containing presence state information representing a change in presence state of the virtual publisher 113-1 maintained by the publishing server 110. However, the received message 103 may comprise any type of message suitable for communication through the messaging system 100. In some embodiments, the message 105 may comprise one of a sequence of messages comprising a video stream being transmitted through the messaging system 100. For example, the receivers 143-c may be subscribed to the broadcast of a video transmission by publisher 103-1. It will be appreciated that if a plurality of receivers 143-c are subscribed to a video stream transmitted by publisher 103-1 that forwarding only a single stream through publisher server 110—rather than a separate stream for each of the receivers 143-c—may significantly reduce the bandwidth required for multicasting a video stream from the publisher 103-1 to a plurality of receivers 143-c. It will be appreciated that just as any sort of message may be transmitted using the messaging system 100 that any sort of stream may be transmitted using the messaging system 100, such as an audio stream, a video stream, a generic data stream, a multi-media conference stream, or any other form of streaming media.

In general, the routing component 117 may be operative to identify a destination server 130-1 maintaining the virtual receiver 133 and determine a communication pipeline 125-1 between the publishing server 110 and the destination server 130-1. It will be appreciated that any one of the known techniques for determining which server hosts a particular client may be used in identifying which destination server 130-1 of the plurality of destination servers 130-b maintain the virtual receiver 133. For example, in some embodiments, the message 105 may contain the identity of the destination server 130-1 within the message itself, such as in an address field of the message 105. Alternatively or additionally, the publishing server 110 may maintain a list or other table storing which destination server of the plurality of destination servers 130-c hosts each virtual receiver associated with a publisher hosted by or virtual publisher maintained by the publishing server 110. It will be appreciated that any number of known techniques for maintaining the correctness of the list may be used, such as techniques used for monitoring associations between clients and servers in a cloud computing or distributed computing environment.

In general, a communication pipeline 125-1 may comprise a channel for server to server communication—such as the communication of server to server subscriptions and notification. Each communication pipelines 125-b may comprise a node-to-node or node-to-cluster half-duplex, buffered stream which may carry multiple messages intended for different subscriptions or receivers in a single message. In a cluster environment, in which a plurality of clusters exist, each cluster comprising a plurality of servers, a unique communication pipeline may exist between each pair of servers within a cluster and a unique communication pipeline may exist each pair of clusters within the communication network.

As each server may host a plurality of publishers and/or receivers, a first server (such as publishing server 110) may have a plurality of messages for communication to a second server (such as destination server 130-1), wherein different messages are intended for different receivers or virtual receivers hosted or maintained by the second server. The communication pipeline (such as communication pipeline 125-1) may therefore send the plurality of messages in a single message unit from the first server to the second server, thereby reducing the overhead of network traffic. In some embodiments, the first server may hold outgoing messages for a short period of time in order to increase the probability that a plurality of messages with be available for batch sending from the first server to the second. This short period of time may comprise a period of time determined to be an acceptable delay in the receipt of a message of a certain type. For example, a delay of five second may be acceptable for the transmission of presence state information, while a delay of 50 milliseconds may be acceptable for the transmission of a unit of video or audio information within a video stream, audio stream, or mixed media stream.

In general, the message sending component 119 may be operative to send the message 105 from the publishing server 110 to the destination server 130-1 over the communication pipeline 125-1. Sending the message 105 from the publishing server 100 to the destination server 130-1 over the communication pipeline 125-1 may comprise any one of the known techniques for transmitting a message over a communication pipeline. It will be appreciated that in some embodiments the message 105 may comprise a header and a body, such that the transmission of the message 105 over the communication pipeline 125-1 comprises sending the message 105 with a modified header or as part of a batch communication wherein the body of the message 105 is combined with the bodies of other messages to form a batched message.

In some embodiments, the received message 105 may comprise a message for a plurality of receivers which are hosted on a plurality of servers. In these situations, the publishing server 110 receiving the message 105 may send a single message to each server within the cluster hosting a receiver of the message and a single message to each external cluster hosting a receiver of the message, even when multiple receivers are hosted by the respective server or cluster.

In some embodiments, a destination server may be operative to receive—such as by using a message receiving component—a message 107 comprising a presence subscription message containing a request to subscribe a receiver 143-1 to a presence state information publisher, such as publisher 103-1, the message 107 therefore for forwarding to a virtual publisher 113-1. The destination server 130-1 receiving the received message 107 may therefore be operative to identify the publishing server 110 maintaining the virtual publisher 113-1 and determine a communication pipeline 125-1 between the destination server 130-1 and the publishing server 110. In various embodiments, this identifying and determining may comprise the actions of a routing component. The destination server 130-1 may further be operative to send the message 107 from the destination server 130-1 to the publishing server 110 over the communication pipeline 125-1. Generally, any of the described techniques for communication messages may be used to communicate subscription messages. Upon receiving the message 107 from destination server 130-1, the publishing server 110 may be operative to process the message 107 to perform a subscription of the receiver 143-1 to the publisher 103-1, such as by subscribing the virtual receiver 133 associated with the receiver 143-1 to the virtual publisher 113-1 associated with the publisher 103-1.

In some scenarios, the received message 107 may comprise a presence subscription message for a plurality of publishers, such as receiver 143-1 requesting to subscribe to all of publishers 103-a. It will be appreciated that rather than sending a plurality of individual requests to subscribe to each of the publishers 103-a, the described techniques may be used to send a single subscription request—which is merely a message—to the publisher server 110 maintaining the virtual publishers 113-a which represent the publishers 103-a. In some scenarios, the received message 107 may comprise a presence subscription message for a plurality of publishers which are hosted on a plurality of servers. In these scenarios, the destination server 130-1 receiving the message 107 comprising the subscription request may send a single subscription request to each server within the cluster hosting a publisher the receiver 143-1 wishes to subscribe to and a single subscription request to each external cluster hosting a publisher the receiver 143-1 wishes to subscribe to, even when multiple publishers requested for subscription are hosted by the respective server or cluster.

Figure 2:
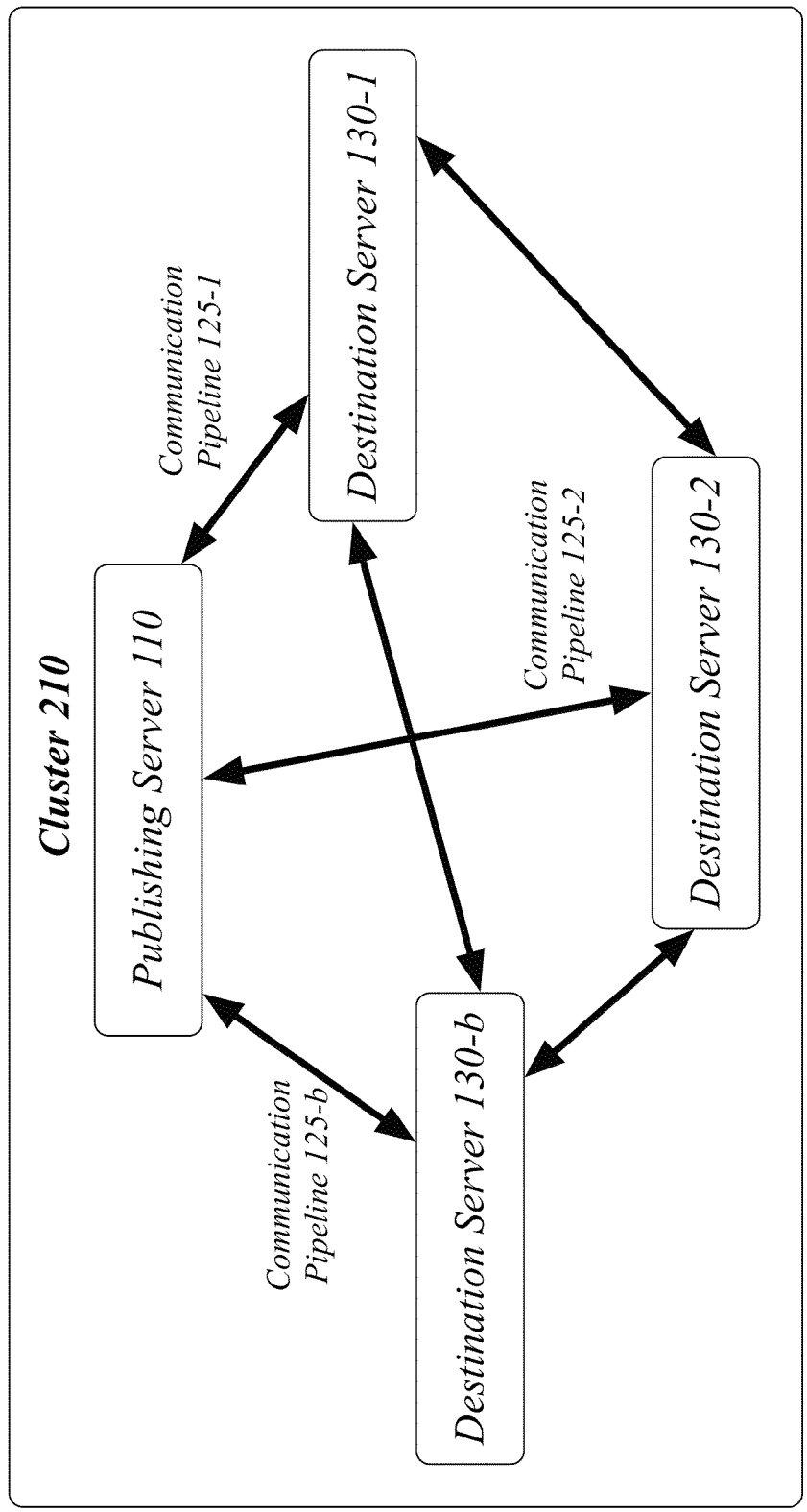
FIG. 2 illustrates an embodiment of a first operating environment for the messaging system of FIG. 1.

FIG. 2 illustrates an embodiment of an operational environment 200 for the messaging system 100. As shown in FIG. 2, with reference to FIG. 1, the publishing server 110 and destination servers 130-b may be organized into a cluster 210. As previously discussed, a communication pipeline may exist for each pair of servers within a cluster. In the illustration of FIG. 2 these communication pipelines are represented by the arrows running between the illustrated servers, with the communication pipelines 125-b representing the communication pipelines between the publishing server 110 and the destination servers 130-b, the remaining arrows representing the remaining communication pipelines which provide for the cluster 210 to comprise a complete graph of the servers connected by communication pipelines.

Figure 3:
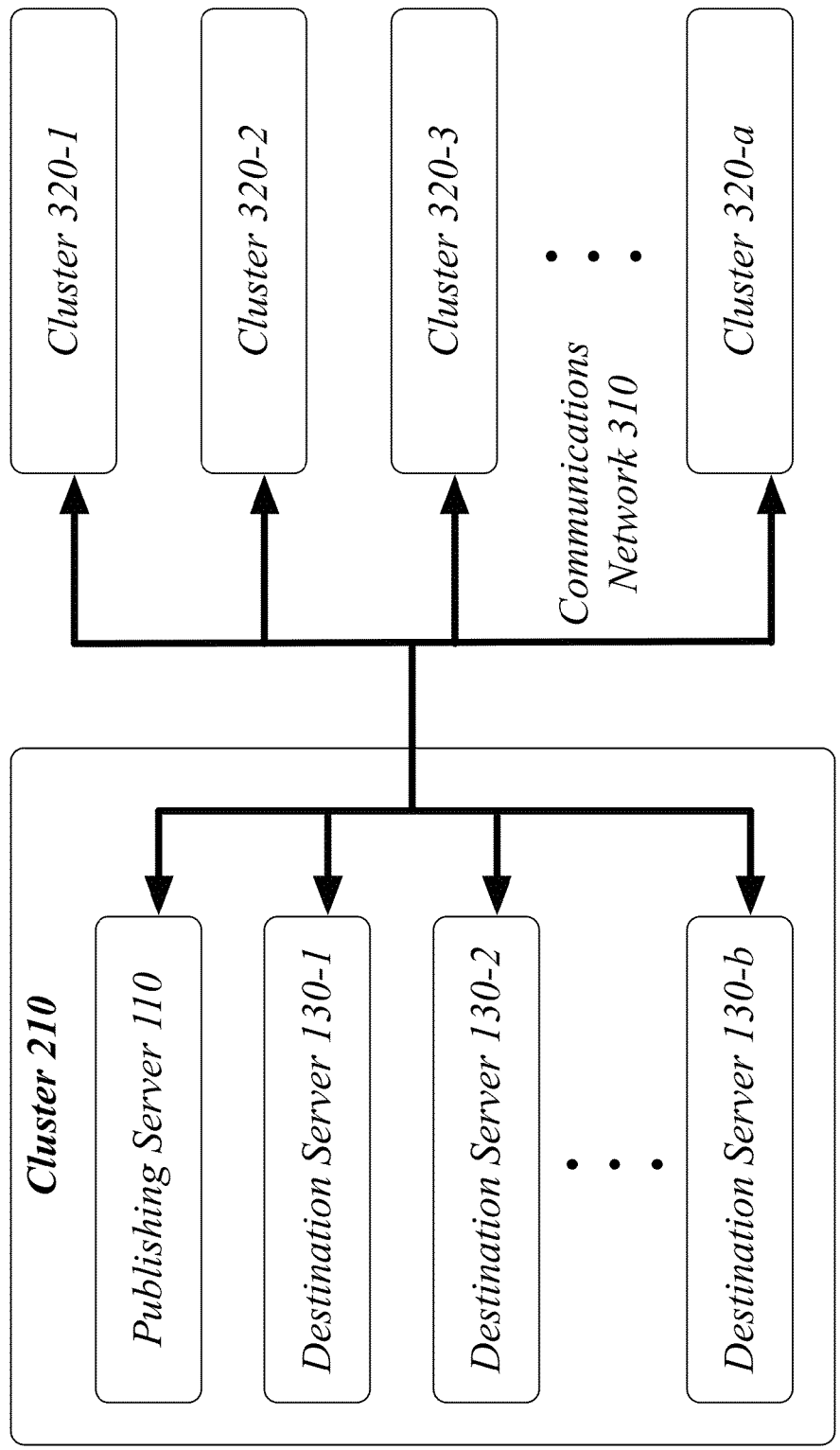
FIG. 3 illustrates an embodiment of a second operating environment for the messaging system of FIG. 1.

FIG. 3 illustrates an embodiment of an operational environment 300 for the messaging system 100. As shown in FIG. 3, with reference to FIG. 1 and FIG. 2, the cluster 210 is one of a plurality of clusters consisting of cluster 210 and additional clusters 320-a. The plurality of clusters are interconnected by communications network 310. The clusters are further networked internally by the communication network 310 as illustrated with cluster 210.

Figure 4:
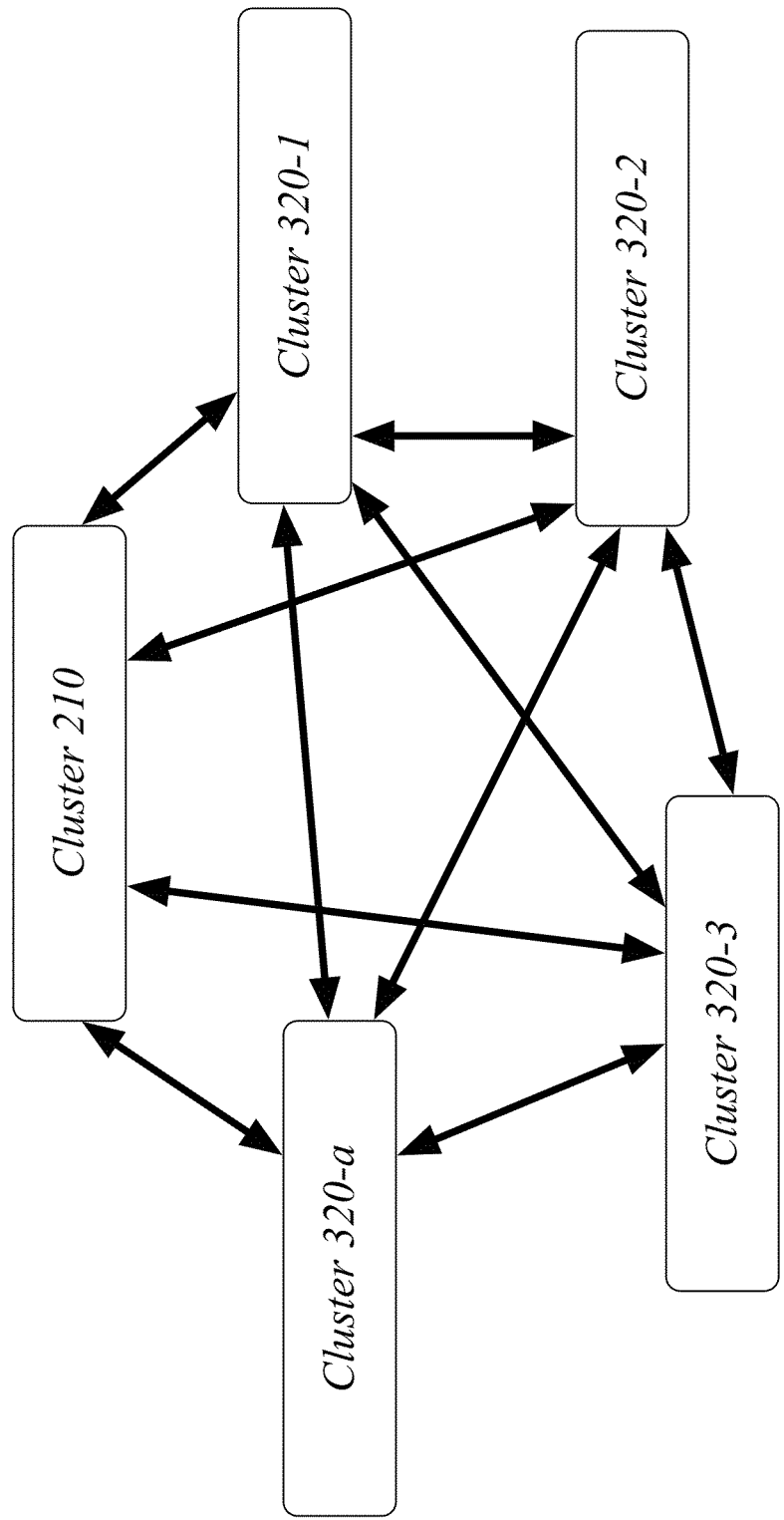
FIG. 4 illustrates an embodiment of a third operating environment for the messaging system of FIG. 1.

FIG. 4 illustrates an embodiment of an operational environment 400 for the messaging system 100. As shown in FIG. 4, with reference to FIG. 1-3, cluster 210 and clusters 320-a form a multi-cluster communication network. A communication pipeline may exist for each pair of clusters within the messaging system. In the illustration of FIG. 4 these communication pipelines are represented by the arrows running between the illustrated clusters, which form a complete graph of the clusters within the messaging system.

This inter-cluster communication pipeline may be used by servers for transmitting messages from one cluster to another. Generally, the servers within a cluster may be operative to treat an external cluster as a single unit, such that a server within a first cluster desiring to send a message to a server within a second cluster would use the unique inter-cluster pipeline between the two to transmit the message, without any attempt to specifically open a communication connection to the specific server within the second cluster the message is intended for. As such, a message transmitted to a cluster may arrive at a different server within the cluster than the message's ultimate destination and require forwarding within it. Further, a message transmitted to a cluster may be intended to be forwarded to a plurality of virtual receivers within the cluster, wherein a single message is used to transmit the message to the cluster for eventual forwarding to the plurality of virtual receivers. Generally speaking, this forwarding within a cluster for a message received from outside the cluster may proceed the same as for a message received at a cluster from a publisher.

As such, in some embodiments, a message may be received at a first server in a first cluster from a third server in a second cluster, wherein a plurality of virtual receivers maintained by a plurality of servers within the first cluster are identified to receive the message, wherein a plurality of communication pipelines between the first server and the plurality of servers are identified, and wherein the message is sent from the first server to the plurality of servers over the identified plurality of communication pipelines.

Figure 5:
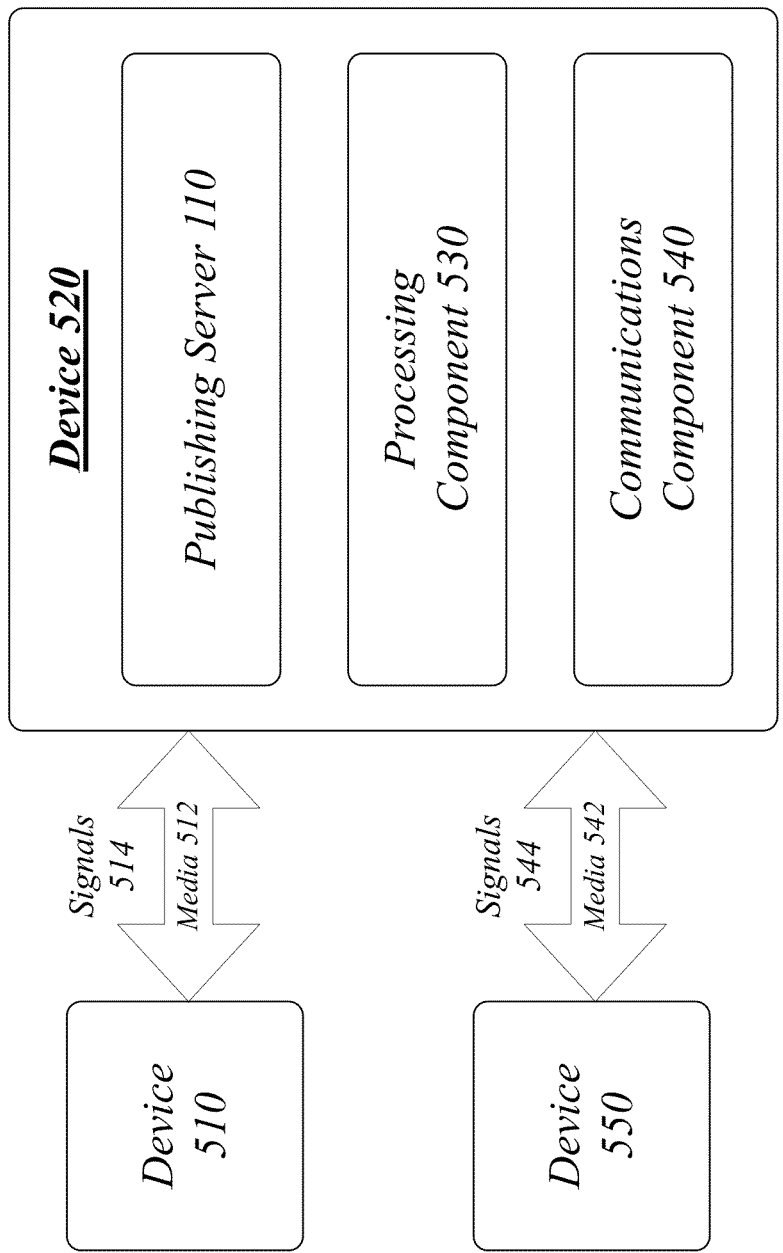
FIG. 5 illustrates an embodiment of a centralized system for the messaging system of FIG. 1.

FIG. 5 illustrates a block diagram of a centralized system 500. The centralized system 500 may implement some or all of the structure and/or operations for the messaging system 100 in a single computing entity, such as entirely within a single device 520.

The device 520 may comprise any electronic device capable of receiving, processing, and sending information for the messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 520 may execute processing operations or logic for the messaging system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 520 may execute communications operations or logic for the messaging system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512, 542 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 520 may communicate with other devices 510, 550 over a communications media 512, 542, respectively, using communications signals 514, 544, respectively, via the communications component 540. The devices 510, 550 may be internal or external to the device 520 as desired for a given implementation.

In some embodiments, device 510 may comprise a publisher, such as publisher 103-1, hosted on the publishing server 110 implemented by device 520. As such, signals 514 sent over media 512 may comprise a message, such as message 105, sent from publisher 103-1 to the publishing server 110 for communication to one or more receivers. In some embodiments, this may comprise the transmission of a presence notification message containing presence state information representing a change in presence state of a virtual publisher—such as virtual publisher 113-1—maintained by the publishing server 110.

In some embodiments, device 550 may comprise a receiver hosted on the publishing server 110 implemented by device 520. As such, in some scenarios, signals 544 sent over media 542 may comprise a subscription request from the receiver to the publishing server 110, the subscription request comprising a request to subscribe to a publisher, such as for receiving changes to presence state information of the publisher. Alternatively, in some scenarios, signals 544 sent over media 542 may comprise the transmission of a message from the publishing server 110 to the device 550, such as a message containing a change to the presence state information of a publisher to which the received is subscribed.

Figure 6:
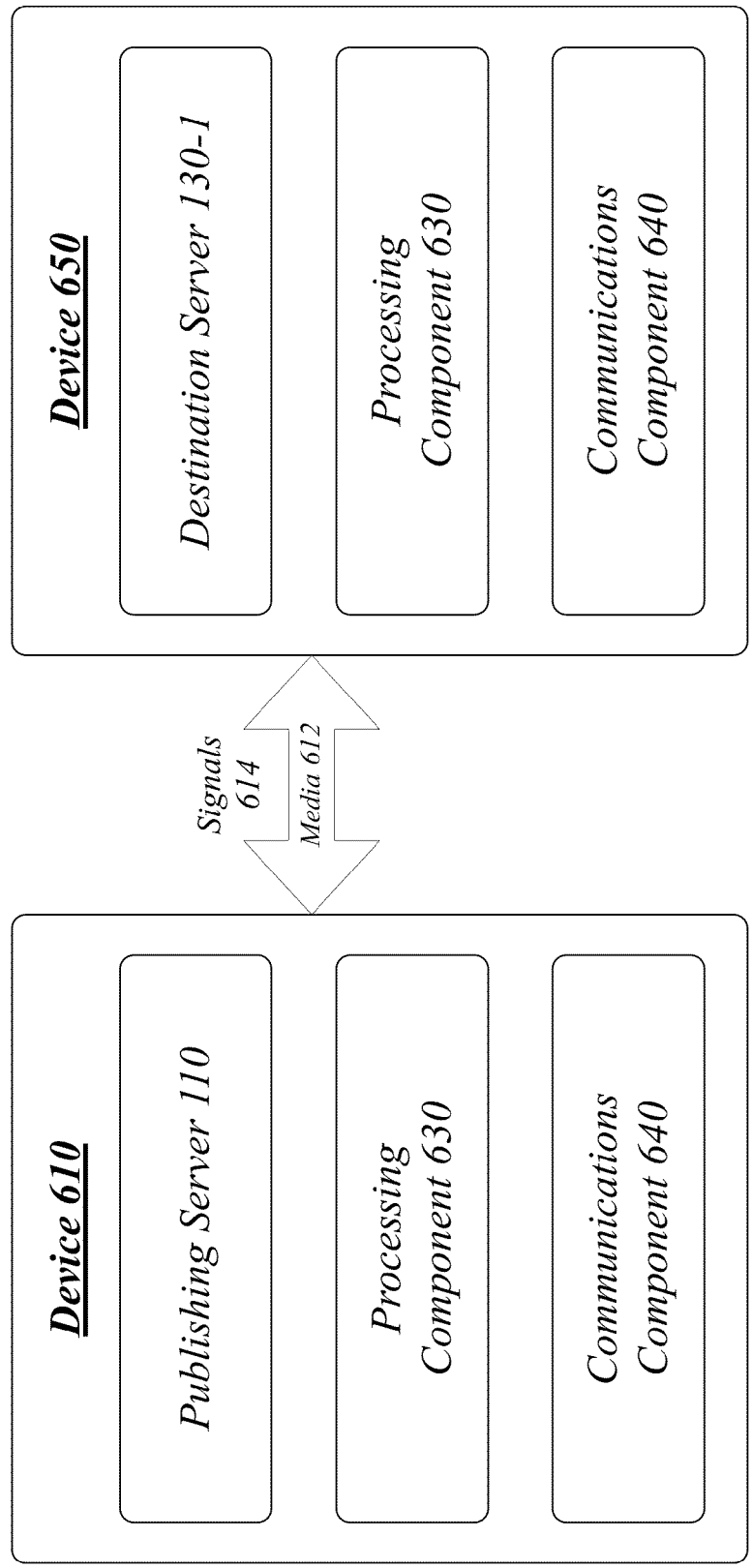
FIG. 6 illustrates an embodiment of a distributed system for the messaging system of FIG. 1.

FIG. 6 illustrates a block diagram of a distributed system 600. The distributed system 600 may distribute portions of the structure and/or operations for the messaging system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a device 610 and a device 650. In general, the device 610 and the device 650 may be the same or similar to the client device 520 as described with reference to FIG. 5. For instance, the device 610 and the device 650 may each comprise a processing component 630 and a communications component 640 which are the same or similar to the processing component 530 and the communications component 540, respectively, as described with reference to FIG. 5. In another example, the devices 610, 650 may communicate over a communications media 612 using communications signals 614 via the communications components 640.

The device 610 may comprise or employ one or more programs that operate to perform various methodologies in accordance with the described embodiments. In one embodiment, for example, the client device 610 may implement the publishing server 110, including the message receiving component 115, the routing component 117, and the message sending component 119. Device 610 may be operative to host, as part of implementing publishing server 110, the virtual publishers 113-a, such as may be used to maintain the presence state information of publishers 103-a.

The device 650 may comprise or employ one or more server programs that operate to perform various methodologies in accordance with the described embodiments. In one embodiment, for example, the device 650 may implement destination server 130-1. As such, media 612 may comprise the communications network 310 and may be used to carry the network traffic of communication pipeline 125-1 between publishing server 110 and destination server 130-1. Accordingly, the signals 614 sent over media 612 may comprise one or more messages or batch messages comprising a communication from a publisher (such as publisher 103-1) to a receiver (such as receiver 143-1).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
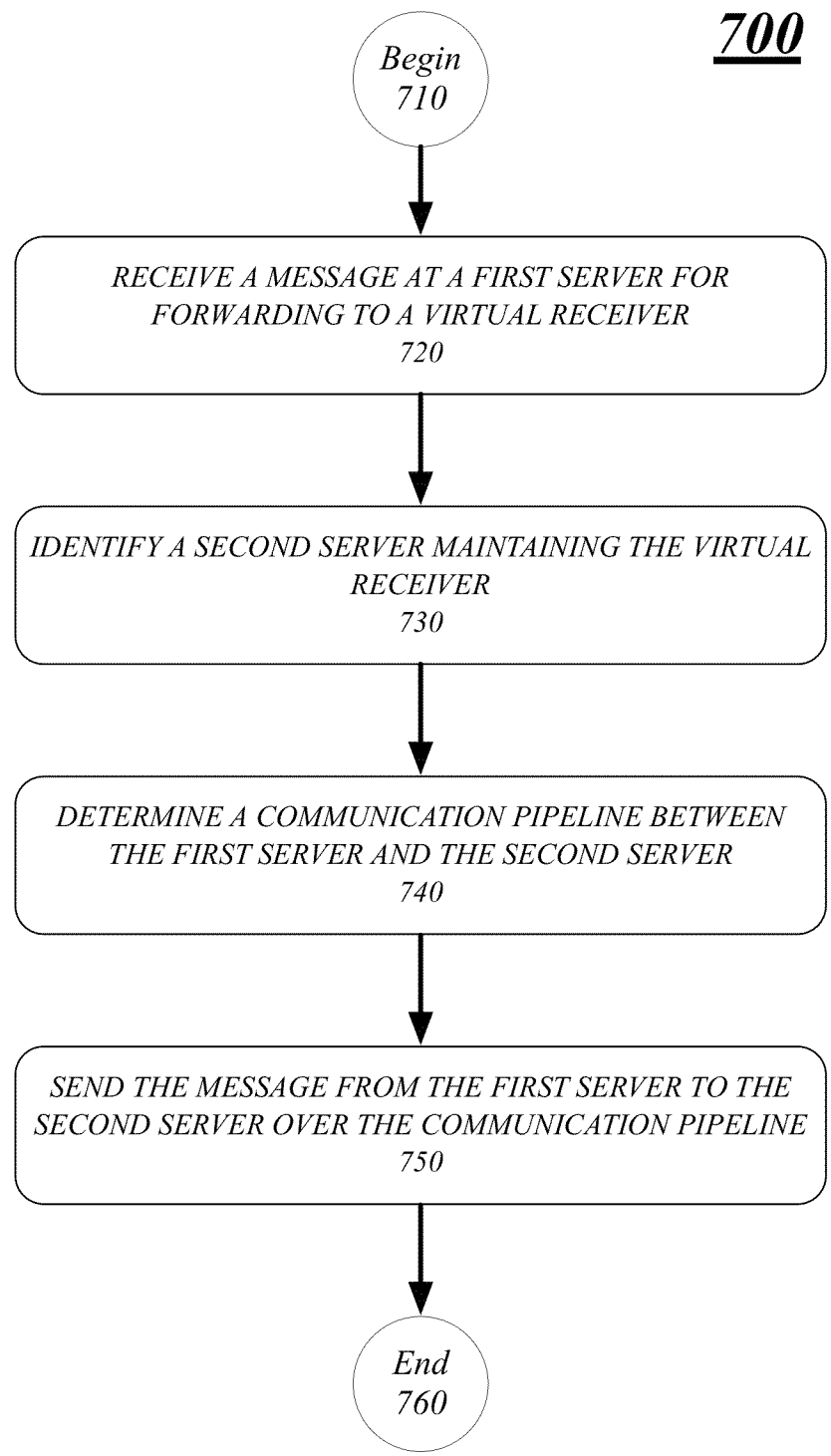
FIG. 7 illustrates an embodiment of a logic flow for the messaging system of FIG. 1.

FIG. 7 illustrates one embodiment of a logic flow 700. The logic flow 700 may be representative of some or all of the operations executed by one or more embodiments described herein.

Operations for the first logic flow 700 are initiated at block 710.

In block 720, a message is received at a first server for forwarding to a virtual receiver. In various embodiments, the virtual receiver may represent a group of receivers associated with a second server. The received message may be received from a publisher associated with the first server. Further, the received message may be associated with a virtual publisher maintained by the first server, wherein each receiver of the group of receivers is subscribed to the virtual publisher. In some embodiments, the received message may comprise a presence notification message containing presence state information representing a change in presence state of the virtual publisher maintained by the first server.

In block 730, a second server maintaining the virtual receiver is identified. It will be appreciated that any one of the known techniques for determining which server hosts a particular client may be used in identifying which server maintains the virtual receiver. For example, in some embodiments, the received message may contain the identity of the second server within the message itself, such as in an address field of the message. Alternatively or additionally, the first server may maintain a list or other table storing which server hosts each virtual receiver associated with a publisher hosted by or virtual publisher maintained by the first server. It will be appreciated that any number of known techniques for maintaining the correctness of the list may be used, such as techniques used for monitoring associations between clients and servers in a cloud computing or distributed computing environment.

In block 740, a communication pipeline between the first server and the second server is determined. In general, a communication pipeline may comprise a channel for server to server communication—such as the communication of server to server subscriptions and notification. In a cluster environment, in which a plurality of clusters exist, each cluster comprising a plurality of servers, a unique communication pipeline may exist between each pair of servers within a cluster and a unique communication pipeline may exist each pair of clusters within the communication network.

In block 750, the message is sent from the first server to the second server over the communication pipeline. Sending the message from the first server to the second server over the communication pipeline may comprise any one of the known techniques for transmitting a message over a communication pipeline. It will be appreciated that in some embodiments the message may comprise a header and a body, such that the transmission of the message over the communication pipeline comprises sending the message with a modified header or as part of a batch communication wherein the body of the message is combined with the bodies of other messages to form a batched message.

In block 760, the logic flow ends.

Figure 8:
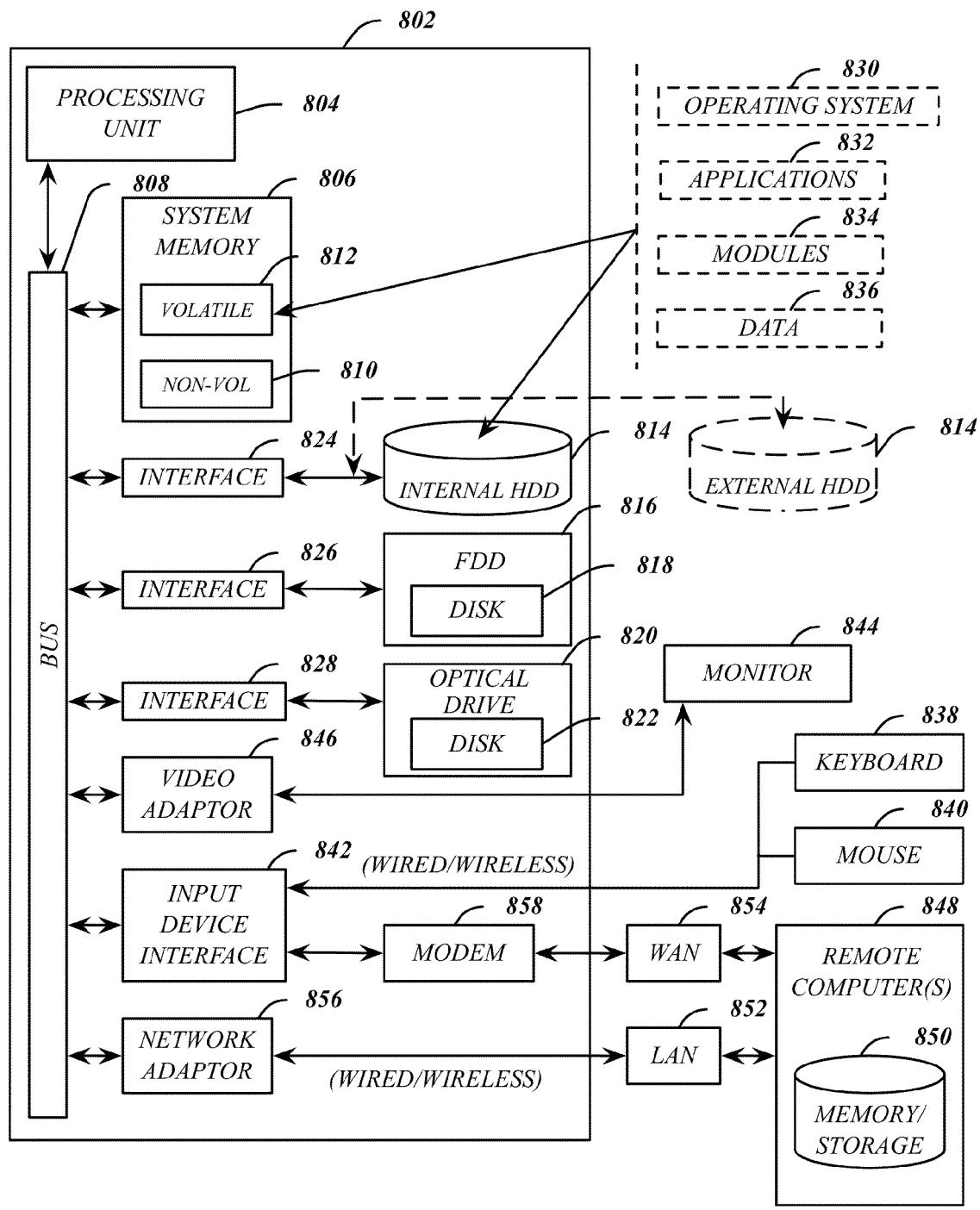
FIG. 8 illustrates an embodiment of a computing architecture.

FIG. 8 illustrates an embodiment of an exemplary computing architecture 800 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

The one or more application programs 832, other program modules 834, and program data 836 can include, for example, the message receiving component 115, the routing component 117, and the message sending component 119.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
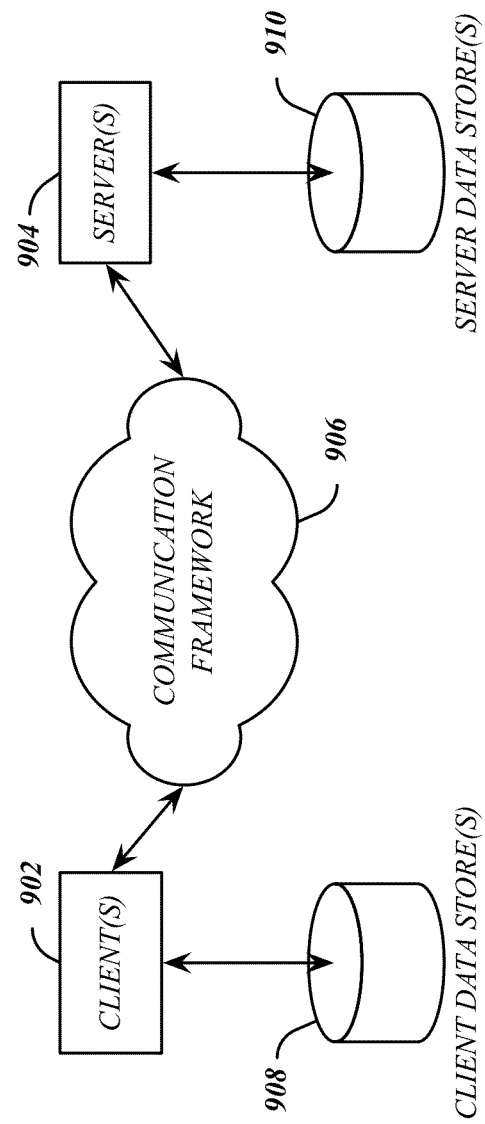
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the client devices 510 and 550. The servers 904 may implement the server systems 110, 130-b, 520, 610, and 640. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols, such as those described with reference to systems 100, 500, 600, and 800. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit coupled to a memory unit comprising components configured to execute on the processor, the components comprising:
a message receiving component to receive a message at a first server for forwarding to a virtual receiver, the virtual receiver being maintained on a single second server;
a routing component to identify the second server maintaining the virtual receiver and determine a communication pipeline between the first server and the second server, wherein the second server is in one of:
a same cluster of servers as the first server or a different cluster of servers from the first server, and wherein each pair of servers in a cluster of servers has a unique communication pipeline, and wherein each pair of clusters of servers has a unique communication pipeline; and
a message sending component to send the message from the first server to the second server over the communication pipeline.

2. The apparatus of claim 1, wherein the virtual receiver represents a group of receivers associated with the second server.

3. The apparatus of claim 2, wherein the received message is associated with a virtual publisher maintained by the first server, wherein each receiver of the group of receivers is subscribed to the virtual publisher.

4. The apparatus of claim 1, wherein the received message comprises a presence notification message containing presence state information representing a change in presence state of a virtual publisher maintained by the first server.

5. The apparatus of claim 1, wherein the received message is received from a publisher associated with the first server.

6. The apparatus of claim 1, wherein the first server is a member of a first cluster and the message is received from a third server in a second cluster, wherein a plurality of virtual receivers maintained by a plurality of servers within the first cluster are identified to receive the message, wherein a plurality of communication pipelines between the first server and the plurality of servers are identified, and wherein the message is sent from the first server to the plurality of servers over the identified plurality of communication pipelines.

7. The apparatus of claim 1, wherein the message sending component is configured to send the message from the first server to the second server over the communication pipeline as part of a batch message comprising a plurality of messages for the virtual receiver, wherein each message in the plurality of messages comprises message information, and wherein the message information in each message is the same message information as the message information in every other message in the plurality.

8. The apparatus of claim 1 wherein each communication pipeline is a half-duplex buffered stream configured to carry multiple messages intended for different recipients within a single message.

9. A computer-implemented method, comprising:
receiving a message at a first server for forwarding to a virtual receiver, the virtual receiver being maintained on a single second server;
identifying the second server maintaining the virtual receiver;
determining a communication pipeline between the first server and the second server, wherein the second server is in one of:
a same cluster of servers as the first server or a different cluster of servers from the first server, and wherein each pair of servers in a cluster of servers has a unique communication pipeline, and wherein each pair of clusters of servers has a unique communication pipeline; and
sending the message from the first server to the second server over the communication pipeline as part of a batch message comprising a plurality of messages for the virtual receiver.

10. The computer-implemented method of claim 9, wherein the virtual receiver represents a group of receivers associated with the second server.

11. The computer implemented method of claim 10, wherein the received message is associated with a virtual publisher maintained by the first server, wherein each receiver of the group of receivers is subscribed to the virtual publisher.

12. The computer-implemented method of claim 9, wherein the received message comprises a presence notification message containing presence state information representing a change in presence state of a virtual publisher maintained by the first server.

13. The computer-implemented method of claim 9, wherein the received message is received from a publisher associated with the first server.

14. The computer-implemented method of claim 9, wherein the first server is a member of a first cluster and the message is received from a third server in a second cluster, wherein a plurality of virtual receivers maintained by a plurality of servers within the first cluster are identified to receive the message, wherein a plurality of communication pipelines between the first server and the plurality of servers are identified, and wherein the message is sent from the first server to the plurality of servers over the identified plurality of notification pipelines.

15. An article of manufacture comprising at least one computer-readable storage device comprising instructions that, when executed, cause a system to:
receive a message at a first server for forwarding to a virtual receiver, the virtual receiver being maintained on a single second server, wherein the virtual receiver represents a group of receivers associated with the second server;
identify a second server maintaining the virtual receiver;
determine a communication pipeline between the first server and the second server, wherein the second server is in one of:
a same cluster of servers as the first server or a different cluster of servers from the first server, and wherein each pair of servers in a cluster of servers has a unique communication pipeline, and wherein each pair of clusters of servers has a unique communication pipeline; and
send the message from the first server to the second server over the communication pipeline as part of a batch message comprising a plurality of messages for the virtual receiver.

16. The article of manufacture of claim 15, wherein the received message is associated with a virtual publisher maintained by the first server, wherein each receiver of the group of receivers is subscribed to the virtual publisher.

17. The article of manufacture of claim 15, wherein the received message comprises a presence notification message containing presence state information representing a change in presence state of a virtual publisher maintained by the first server.

18. The article of manufacture of claim 15, wherein the received message is received from a publisher associated with the first server.

19. The article of manufacture of claim 15, wherein the first server is a member of a first cluster and the message is received from a third server in a second cluster, wherein a plurality of virtual receivers maintained by a plurality of servers within the first cluster are identified to receive the message, wherein a plurality of communication pipelines between the first server and the plurality of servers are identified, and wherein the message is sent from the first server to the plurality of servers over the identified plurality of notification pipelines.

* * * * *